Sept. 17, 1968  L. D. KREITZ  3,401,724
DUST COLLECTOR
Filed Oct. 12, 1965

INVENTOR
LLOYD D. KREITZ
BY
Richard F. Funk
ATTORNEY

United States Patent Office 3,401,724
Patented Sept. 17, 1968

3,401,724
DUST COLLECTOR
Lloyd D. Kreitz, 10022 E. River Blvd.,
Coon Rapids, Minn. 55433
Filed Oct. 12, 1965, Ser. No. 495,269
12 Claims. (Cl. 143—6)

ABSTRACT OF THE DISCLOSURE

A dust collector for a radial arm saw comprises a funnel-shaped hood positioned at the rear of the worktable and arranged to be arcuately moved thereover in alignment with the saw.

---

This invention relates to dust collectors and is particularly concerned with a dust collector for a radial arm saw.

In its ability to perform a variety of woodworking functions, the radial arm saw is perhaps unique. Basically, this piece of equipment involves a flat work table, at the rear of which is an extensible vertical column; an arcuately movable arm extends horizontally from the top of the column, and a rotary power saw is carried by the arm. In most operations the arm extends over the work table, the saw being moved along the arm to cut a workpiece positioned on the table. Unlike bench saws, which throw most of the chips and wood fragments downward, radial arm saws tend to distribute sawdust all around the workshop in which they are used. This fact has been recognized for many years, but woodworking equipment manufacturers have nevertheless failed to develop an effective but comparatively simple and inexpensive dust collector for radial arm saws. My invention provides such a device.

Positioned above the work table, the blade on a radial arm saw propels most sawdust in a diverging conical path at a slight angle upward from the top of the table. Thus, where a vacuum is applied to the guard which surrounds the upper part of the saw, the major part of the sawdust escapes. It has been suggested that an evacuated receptor, slotted to align with common saw cuts, be placed at the rear of the table, but such devices are inconvenient, expensive, limited to a few simple sawing operations, and generally ineffective.

My invention provides a simple, economical, convenient, and highly effective dust collector for a radial arm saw. It is adjustable, adaptable to almost every use to which a radial arm can be put, without obstructing the positioning of the workpiece or inconveniencing the operator. In accordance with my invention I provide a radial arm saw with a generally funnel-shaped hood positioned at the rear of the work table on or slightly above the upper surface. The wide inlet end of the hood opens toward the front of the work table and the narrow outlet end of the hood opens oppositely. The hood is horizontally pivotally connected to the radial arm saw assembly so that it can be arcuately rotated to align with the saw blade.

My invention will be better understood by reference to the accompanying drawing, in which like numbers refer to like parts in the several views, and in which FIGURE 1 is a perspective view of a radial arm saw showing a presently preferred embodiment of my dust collector in position;

Figure 1:
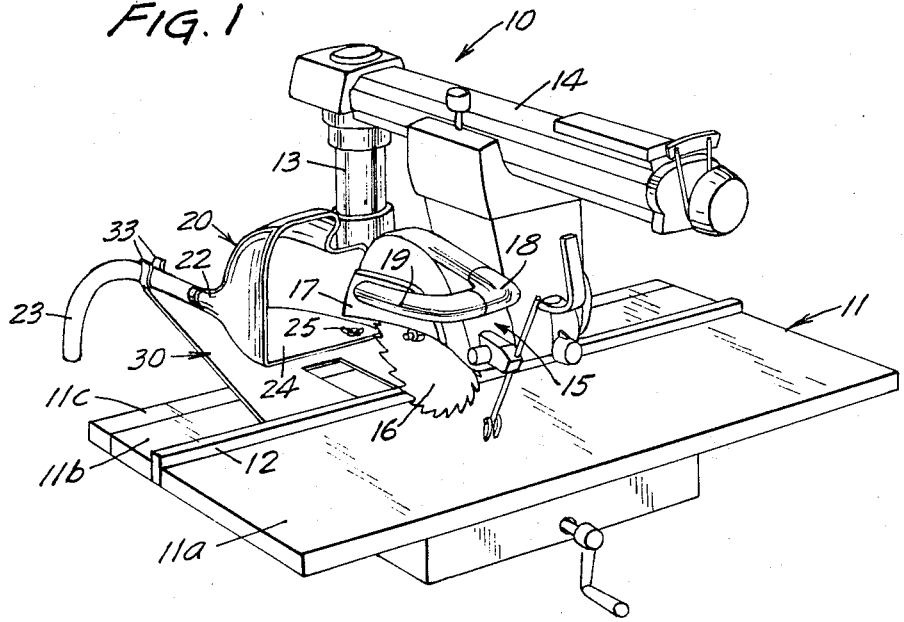
Figure 2:
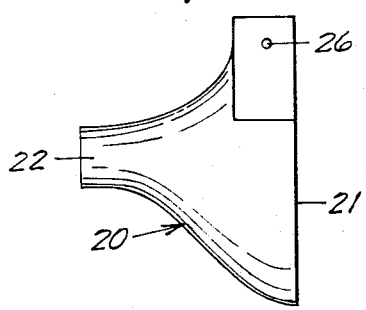
FIGURE 2 is a plan view of the hood of my dust collector.
Figure 5:
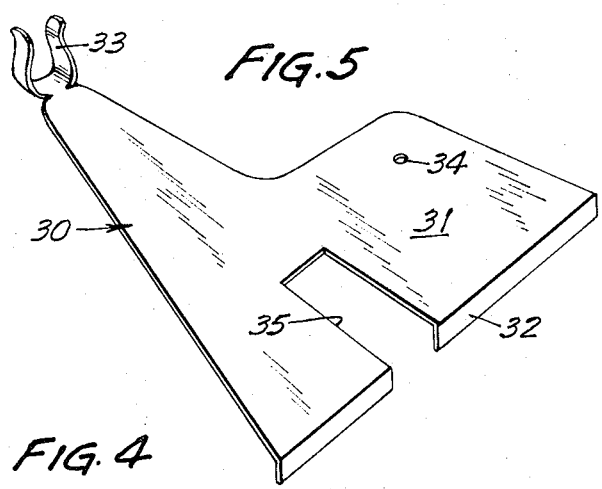
FIGURE 5 is a perspective view of a base for the hood.
Figure 3:
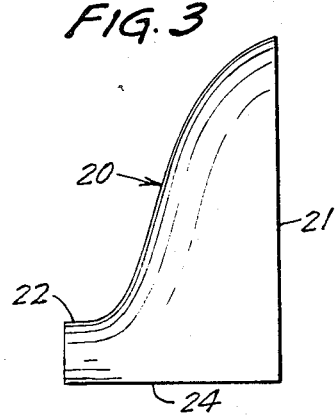
FIGURE 3 is a left elevational view of the hood.
Figure 4:
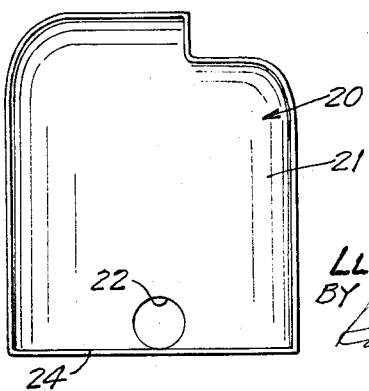
FIGURE 4 is a front elevational view of the hood.

In the drawings, radial arm saw assembly 10 comprises work table 11, made up of front table 11a and back table 11b, between which is positioned rip fence 12. Spacer board 11c is located at the back of rear table 11b, and clamps (not shown) draw the subparts of table 11 and rip fence 12 snugly together. Table 11 is supported by a frame (not shown) which also supports extensible column 13, located at the rear of table 11. Extending horizontally from the top of column 13 is radial arm 14, which is capable of rotating through 360°, but which is generally positioned over the top of table 11. Mounted on arm 14, so as to move therealong, is saw carriage 15, including rotary saw blade 16 and guard 17. Extending from guard 17 is discharge elbow 18, through which sawdust carried by blade 16 is discharged, at right angles to blade 16, during ripping operations (when saw carriage 15 is held in fixed position, with blade 16 parallel to fence 12). The entire assembly 10, as just described, comprises conventional equipment and forms no part of my invention per se.

Positioned over the rearmost portion of table 11 is generally funnel-shaped hood 20, having a wide inlet opening 21 (e.g., 14 inches high and 12 inches wide) and a narrow outlet opening 22. The hose 23 of a conventional home shop vacuum cleaner (not shown) is desirably connected to outlet 22 to insure the more effective removal of sawdust directed into hood 20. Although the exact shape of hood 20 is susceptible of considerable variation, certain considerations should be borne in mind. For example, the bottom 24 should be flat, not only to insure the most effective collection of dust but also to permit aligning hood 20 with saw blade 16 as arm 14 is moved to different positions. Desirably hood 20 is pivotally mounted on assembly 10 so that it can be arcuately horizontally rotated to accomplish this function. Pivotal mounting can be achieved in various ways; e.g., spring clamps can be attached to the rear of hood 20 and clamped around column 13. If such clamps are attached to the exposed inner extensible portion of column 13, rotation of arm 14 will automatically align inlet 21 with saw blade 16. The minor amount of dust which is carried around with saw blade 16 and is normally blown through discharge elbow 18 may also be effectively directed toward hood 20 in crosscut operations by attaching extension elbow 19 to discharge elbow 18. In ripping operations, extension elbow 19 is removed, permitting dust to be discharged directly toward hood 20.

It is considered important that hood 20 be so designed as to extend in front of column 13; otherwise considerable dust would fan out in that direction and escape into the workshop and column 13 would interfere with the pivotal movement of hood 20 if behind. Hood 20 should also be so designed and positioned that the closest point at which saw carriage 15 approaches column 15 results in the close proximity of guard 17 and the back wall of hood 20.

One convenient way in which hood 20 can be arcuately positioned in a plane parallel to the top of table 11 is shown in the drawings. Base 30 is formed from sheet metal, bent to provide support 31 and lip 32, the latter permitting attachment between fence 12 and rear table 11b. The front portion of base 30 is cut away to insure that saw blade 16 will not contact it during extreme rear movement. Support 31 is provided with hole 34, through which a bolt (not shown) may be passed, permitting hood 20 to be positioned thereover, thumbscrew 25 serving to hold hood 20 in position on base 30 but permitting arcuate adjustability as desired. At the rearmost portion of base 30 is optionally attached spring clamp 33, which may be used to hold vacuum hose 23 in position.

I anticipate that several modfications may be made without departing from the spirit of my invention. For example, base 30 may be eliminated altogether, a screw or bolt serving to attach hood 20 directly to the rear table 11b. Hood 20 is conveniently formed from glass fiber-reinforced polyester resin, which is light weight, durable and easily molded, but it can also be fabricated from other materials, including metal. The exact shape of hood 20 is determined by the particlar saw on which it is used, but to maintain adequate horizontal arcuate adjustability, it should be so constructed as to rotate 45° without bumping into the fence. It may also be desirable to modify support 31 so that a portion thereof extends over floor 24 of hood 20, thereby preventing dust buildup along the front edge of inlet opening 21 adjacent floor 24. The upper surface of this edge may also be tapered and the top of hood 20 inclined slightly forward to similarly minimize dust buildup.

Although hood 20 is particularly intended for attachment at the rear of table 11 (where sawdust is directed in most operations), it may also be installed in other positions to collect dust from attachments which may be used on the radial arm saw. For example, if saw assembly 15 is positioned parallel to the front edge of table 11 and saw blade 16 replaced with a rotary abrasive disc, it will be desirable to so locate hood 20 that the dust of sanding is collected.

To minimize any loss of sawdust which may occur when a rapidly moving stream strikes the inner wall of hood 20 and is diverted out, one or more of the walls defining inlet 21 may be provided with an inturned lip.

What I claim is:

1. In combination with a radial arm saw assembly comprising a horizontal work table, a vertical column at the rear of said table, a horizontally adjustable arm rotataby attached to the upper end of said column so as to be positionable over said table, and a rotary saw carried by said arm:

a dust collector positioned at the rear of said table, said collector comprising a support means connected to said assembly, a generally funnel-shaped hood connected to and supported by said means, said hood having a wide inlet which opens toward the front of said table, said inlet being positioned entirely above the plane of said table, said hood being connected to said assembly to permit arcuate horizontal movement about said column with the bottom of said inlet in contact with the upper surface of the rear portion of said table and said hood remaining vertically and horizontally stationary as the saw is drawn along the arm.

2. The device of claim 1 wherein the bottom of said hood is substantially planar and parallel to the top of said table.

3. The device of claim 2 wherein said outlet is closely adjacent the bottom of said hood.

4. The device of claim 1 wherein a vacuum hose is connected to said outlet.

5. The device of claim 1 wherein a portion of a wall of said hood defining said inlet extends in front of said column.

6. In combination with a radial arm saw assembly comprising a horizontal work table which includes a front table, a rear table, a fence between said front table and said rear table, and means to clamp said tables and fence together, an extensible vertical column at the rear of said table, a horizontally positioned rotatable arm attached to the upper end of said column so as to be positionable over said work table, and a rotary saw carried by said arm:

a dust collector comprising a base member which includes a generally horizontal portion in substantially the same plane as the top of said rear table and connected to said assembly, and a generally funnel-shaped hood connected to said base member, and at least partially overlying said horizontal portion, said hood having a wide inlet which opens toward the front of said work table and a narrow outlet which opens away from the front of said work table, said hood being pivotally connected to said base member to permit limited arcuate movement over the horizontal portion of said base member and the upper surface of said rear table.

7. The device of claim 6 wherein said base member is provided with a down-turned lip which is clamped between said fence and said rear table.

8. The device of claim 6 wherein the bottom of said hood is substantially planar and snugly adjacent the horizontal portion of said base member.

9. The device of claim 8 wherein said outlet is located at the rear of said hood closely adjacent said bottom.

10. The device of claim 9 wherein a vacuum hose is connected to said outlet.

11. The device of claim 6 wherein the rotary saw is provided with a guard which has at its upper portion a curved conduit extending parallel to the saw blade, said conduit having a discharge opening facing the hood inlet, whereby the minor amount of dust which normally follows the saw blade around is directed toward the collector.

12. A dust collector for use in combination with a radial arm saw assembly comprising a horizontal work table, a vertical column at the rear of said table, a horizontally adjustable arm rotatably attached to the upper end of said column so as to be positionable over said table, and a rotary saw carried by said arm, said collector comprising:

a base member having a large flat surface and a relatively small lip extending at right angles thereto, means for attaching said lip to said assembly at the rear of said table, a generally funnel-shaped hood having a wide inlet defined by hood portions comprising a flat bottom portion and a side portion which intersects said bottom portion to form a corner, means adjacent said corner adjustably connecting said hood to said base member to permit arcuate movement of said hood over the flat surface of said base member.

References Cited

UNITED STATES PATENTS

| | | | |
|---|---|---|---|
| 1,636,924 | 7/1927 | Porter | 143—6 |
| 2,011,984 | 8/1935 | Rosenberger | 51—273 X |
| 2,839,102 | 6/1958 | Kido | 143—157 |
| 3,322,169 | 5/1967 | Hillard | 143—6 |

DONALD R. SCHRAN, *Primary Examiner.*